Oct. 17, 1950 W. S. COREY 2,526,200
UTILITY SERVICE CLAMP
Filed Feb. 26, 1949

INVENTOR:
W. S. Corey
BY
O. Martin
ATTORNEY

Patented Oct. 17, 1950

2,526,200

UNITED STATES PATENT OFFICE 2,526,200

UTILITY SERVICE CLAMP

William Spencer Corey, Tujunga, Calif.

Application February 26, 1949, Serial No. 78,515

4 Claims. (Cl. 285—108)

This invention relates to clamps for public service conduits, such as used in cases where it is desired to provide outlets for such conduits or when it is found necessary to repair leaks therein. More particularly the present invention has reference to improvements in the type of utility service clamp disclosed in the patent to Herman Wirz, Jr., No. 2,296,968, dated September 29, 1942.

In the aforenamed patent resilient packing elements are used during the assembly of the members of the clamp in order correctly to position one of the members relative to the other and both members relative to the conduit about which the clamp is being mounted. The molten lead is then poured into the spaces between the clamping members and the conduit in the manner described in said patent. Experience over a period of years of public use of the clamp has shown that, when the clamp is mounted in position on the conduit in the manner described, leakage of the fluid passing through the conduit will at times occur adjacent the packing elements, which latter are allowed to remain seated within the clamp during the operation of securing the clamp in position on the conduit.

In view of the foregoing, it is the object of the present invention to provide, in a structure such as disclosed in the aforenamed patent, flanges forming an integral part of the clamp members for engagement with correspondingly positioned recesses of the members, the purpose of these flanges being to cover the joints between the clamping members at and about the points where the packing elements are placed to the end that leak-proof joints may be obtained at these points.

The object of my invention, together with the many advantageous features thereof, will be better understood from the following detailed description and reference is invited to the accompanying drawings, of which:

Figure 1:
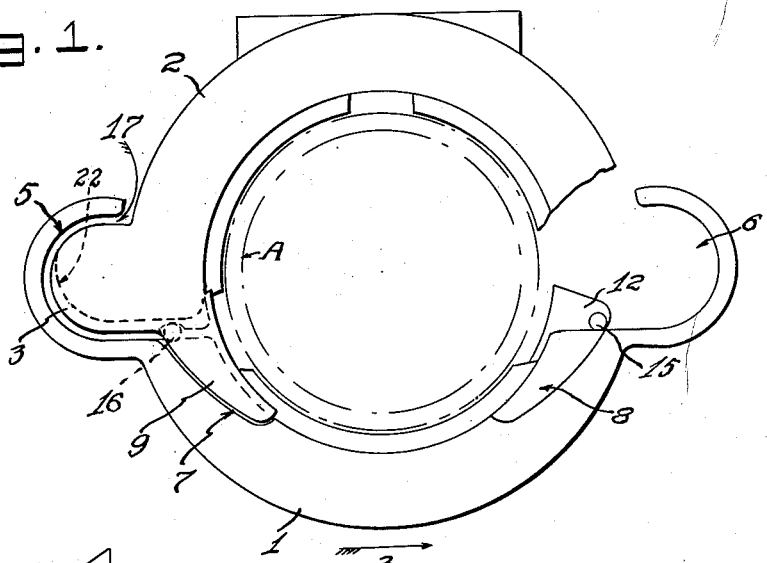
Fig. 1 is an end view of a utility clamp embodying the invention, with the upper member thereof partly broken away in order better to illustrate the construction of the lower member thereof.
Figure 4:
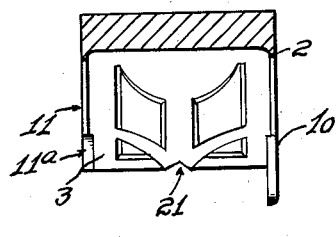
Fig. 4 is a side view of the upper clamping member taken in the direction of the arrow 4 of Fig. 2.

Referring in the first instance to Fig. 1, the numerals 1 and 2 designate the lower and upper clamping members, respectively, and it is important to note that the general outline of the two members may remain substantially as disclosed in the above named patent, the main difference being that the interengaging beads 3, 4 of the upper clamping member and grooves 5, 6 of the lower clamping members are made at the opposite ends thereof with overlapping flanges and that the flanges of the upper member seat in corresponding recesses of the lower member when the members are assembled in the manner which will now be described in detail.

Figure 3:
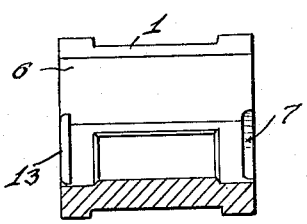
Fig. 3 is a cross-sectional side elevational view taken substantially through the center of the lower clamping member in the direction of the arrow 3, of Fig. 1.

The lower member 1 is, as best shown in Figs. 1 and 3, at one end thereof recessed, as indicated at 7 and 8, to receive therein flanges 9 and 10 of the beads downwardly and inwardly extending from the upper clamping member. When such flanges are provided at one end of the upper clamping member it is seen that, in assembling the two members, it is necessary to cause the opposite end 11 of the upper clamping member to pass into and through the grooves of the lower clamping member in order to cause the flanges 9, 10 to enter into the recesses 7, 8 of the lower clamping member. It is also important to note that the lower clamping member at the end opposite the recesses 7, 8 is made along the inner edge thereof with downwardly and inwardly extending flanges 12, 13, against which the beads 3, 4 of the upper clamping member come to a stop when the members become completely assembled. In order to facilitate molding and casting of the two members of the clamp, it is quite important that the flanges do not project beyond the ends of the members and this is the reason for recessing the lower member at 7, 8 to receive the flanges 9, 10, of the upper member. Similarly, the opposite end of the upper member is recessed, as indicated at 11, 12 to pass over the flanges 13, 14 of the lower member.

Figure 2:
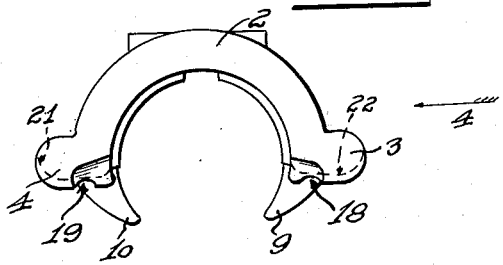
Fig. 2 is a substantially corresponding view of the upper member as it appears when removed from the lower clamping member and viewed from the opposite side thereof.
Figure 5:
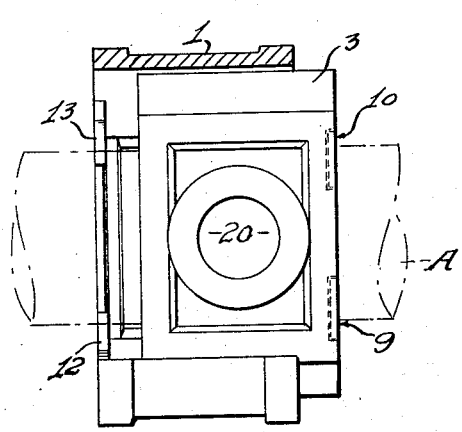
Fig. 5 is a plan view showing the members of the clamp as they appear when in process of assembly on a conduit and with the outer portion of the lower clamping member broken away at one side thereof in order better to illustrate the relation of the members to each other and to the conduit.

After the members have been placed about the conduit A, as indicated in Figs. 1 and 5, it is accepted practice manually to elevate the upper member within the grooves of the lower member in order to provide space for insertion of the packing elements 15, 16, whereupon the upper member again is released and any handy tools, such as small chisels, screwdrivers or the like, are forced into the spaces between the ears of the upper clamping member and the inner surface of the grooves of the lower clamping member substantially in the direction indicated by the arrow 17 in Fig. 1, thereby correctly to align the ears within the grooves of the lower member. The packing members are held in properly aligned position within indentations 18, 19 of the upper member. These indentations are best shown in Fig. 2.

Molten lead is thereupon poured into the spaces between the ears and the lower clamping member, also substantially in direction of the arrow 17, whereupon the clamp, upon cooling and setting of the lead, is manually turned on the conduit in the direction required in each particular case and molten lead is then poured into the spaces between the passage through the clamp and the outer surface of the conduit in the manner described in the aforenamed patent. During the operation of pouring the lead it is, of course, required temporarily to apply packing of soft clay or other suitable material about the conduit and against the ends of the clamp, substantially as set forth in the said patent. It is also to be noted that where the upper clamping member is made with a laterally directed outlet, such as indicated at 20 in Fig. 5, it becomes necessary temporarily to apply sufficient amount of similar soft material to this outlet in order to prevent leakage of the molten lead as it flows between the spaces of the member and conduits.

While I have in the foregoing description followed the two step method of injecting the molten lead into the spaces between the clamp and the conduit on which it is mounted, it is possible to complete this injection in a single step and so to save considerable time and labor. For this purpose it is merely required to sink recesses into the inner surfaces of the upper member from the bottom edges thereof, substantially as indicated at 21, 22, to form gates through one of which the lead may be poured after the clamp has been turned on the conduit to bring the passage 20 into the correct lateral direction relative to the conduit.

I claim:

1. A clamp for a conduit comprising axially interengageable upper and lower clamping members combining to form a substantially cylindrical body having a cylindrical passage for the conduit therethrough, the upper member being made with semi-cylindrical beads laterally projecting therefrom and axially extendible through corresponding recesses of the lower member and having flanges downwardly and inwardly projecting from the beads at one end thereof, said flanges engaging recesses in the inner edge of the lower member when the members are axially assembled about the conduit.

2. A utility clamp for a conduit comprising axially inter-engageable upper and lower clamping members combining to form a substantially cylindrical body having a cylindrical passage for the conduit therethrough, the upper member being made with semi-cylindrical beads laterally extending therefrom and axially extendible through corresponding recesses of the lower member and having flanges downwardly and inwardly projecting from the beads at one end thereof, said flanges engaging recesses in the inner edge of the lower member when the members are axially assembled about the conduit, the said lower member having flanges downwardly and inwardly projecting from its inner edge at the opposite end thereof to serve as stops for the upper member when the beads of the latter are fully seated in the grooves of the lower member.

3. A clamp for a conduit comprising an upper and a lower clamping member axially interengageable, the upper member having semi-cylindrical beads laterally extending therefrom and freely movable into correspondingly shaped grooves in the sides of the lower member, the combined members having a cylindrical passage therethrough of a size freely to encompass the conduit, there being semi-circular indentations axially sunk in the bottom surfaces of the beads, resilient cylindrical packing elements insertable within the spaces between the beads and the inner surfaces of the grooves in the lower member and seatable in said indentations, the upper member having flanges downwardly and inwardly projecting from the beads at one end thereof in position to cover the ends of said packing elements, there being recesses in the inner edge of the lower member aligned to receive therein the flanges of the upper member, the lower member having at the opposite end thereof downwardly and inwardly projecting flanges positioned to cover the opposite ends of the packing elements when the clamping members are fully assembled.

4. A clamp for a conduit comprising axially inter-engageable upper and lower clamping members combining to form a body having a cylindrical passage for the conduit therethrough, the upper member being made with semi-cylindrical beads laterally projecting therefrom, there being grooves sunk into and extending from the outer surfaces of the beads along the bottom surfaces thereof to form lead injecting gates, the lower member having recesses therein encompassing the beads, one end of the lower member being made along the passage therethrough with indentations downwardly extending from said recesses and at the other end thereof with corresponding inwardly projecting flanges, the beads of the upper member having at one end thereof downwardly extending flanges lodging within said indentations and at the other end corresponding indentations, receiving the flanges of the beads.

WILLIAM SPENCER COREY.

REFERENCES CITED

The following references are of record in the file of this patent:

UNITED STATES PATENTS

| Number | Name | Date |
| --- | --- | --- |
| 549,594 | Cooper et al. | Nov. 12, 1895 |
| 2,239,651 | McMurray et al. | Apr. 22, 1941 |
| 2,296,968 | Wirz | Sept. 29, 1942 |